Figure 7A:
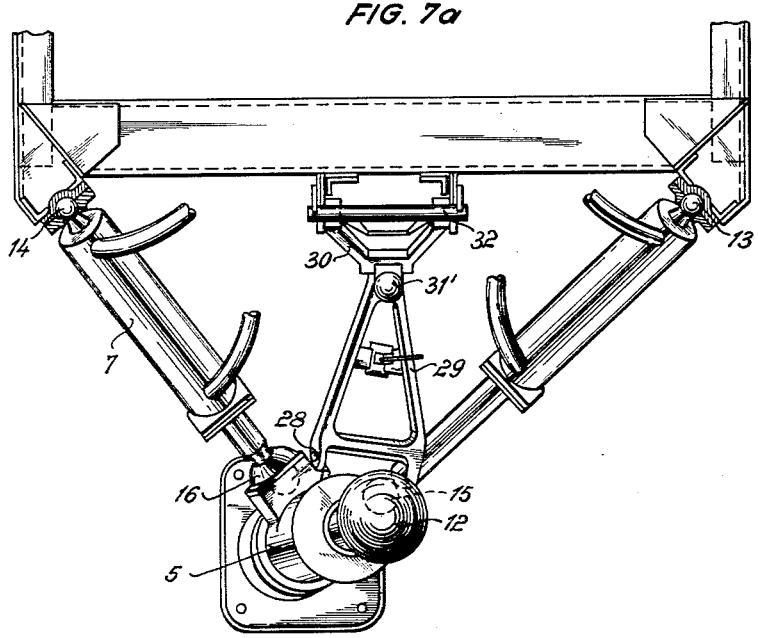

June 28, 1960  H. W. KRAUS  2,942,676
LOAD TRANSPORTATION MEANS
Filed Dec. 4, 1957  3 Sheets-Sheet 1
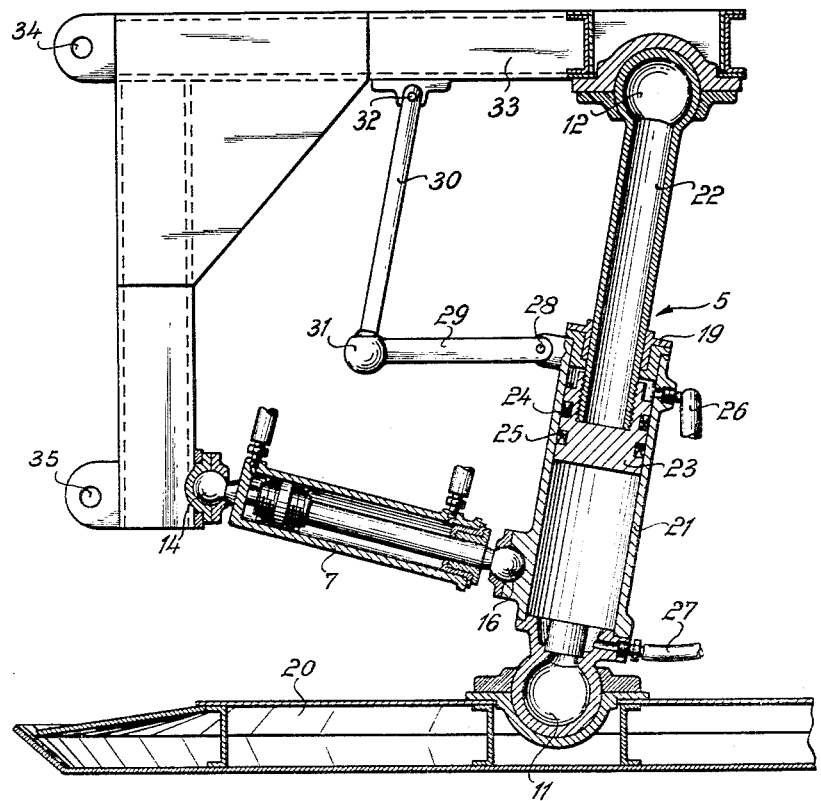
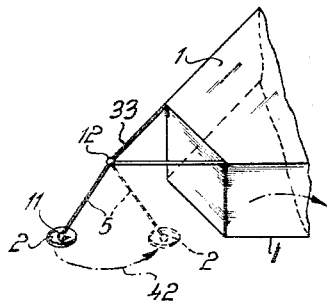
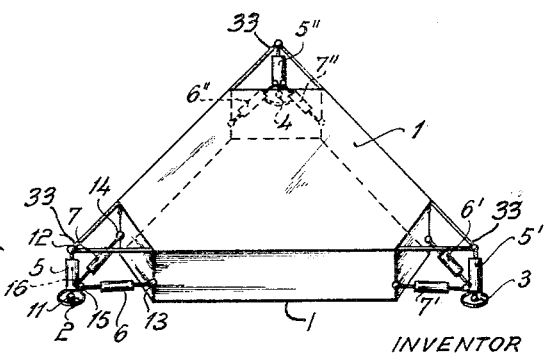
INVENTOR
HANS W. KRAUS June 28, 1960 H. W. KRAUS 2,942,676
LOAD TRANSPORTATION MEANS
Filed Dec. 4, 1957 3 Sheets-Sheet 2

INVENTOR
HANS W. KRAUS
BY

June 28, 1960 H. W. KRAUS 2,942,676
LOAD TRANSPORTATION MEANS
Filed Dec. 4, 1957 3 Sheets-Sheet 3

INVENTOR
HANS W. KRAUS
By

2,942,676
LOAD TRANSPORTATION MEANS

Hans Wilhelm Kraus, Gartenstr. 4, Buckeburg, Land Niedersachsen, Germany

Filed Dec. 4, 1957, Ser. No. 700,592

10 Claims. (Cl. 180—8)

The invention relates to load transportation means having walking legs, especially for heavy loads and for the movement of earth-moving equipment as for instance heavy excavating machinery, power shovels, working and conveying machines in brown coal and ore mining.

This kind of machinery in the past was equipped with Caterpillar chains, for movement across the ground. The Caterpillar chains, however, only allow a movement in a straight direction, so that a side movement of the machine can be achieved only by repeated forward and backward movements with intermediate curves. It is difficult to turn with Caterpillar chain drives when going through a bend or turning on the spot as a considerable sideward sliding movement of the Caterpillar chain relative to the ground takes place which results in an excessive strain of the Caterpillar chain and a rooted-up ground surface.

Load transportation means are known wherein the load is transported by means of two walking legs moving in a longitudinal direction relative to the load wherein the load is partially lifted with each step. These known means however, have the drawback that a movement can take place only in one direction. However, in many cases it is necessary to perform a movement which is independent of the orientation of the machine. With these defects of the prior art in mind, it is the primary object of this invention to provide a heavy load transporting device which may move the load in any direction without first orienting the load with respect to the direction of travel.

Another object of the invention is to provide a device of the character described wherein the ground surface is not damaged in any manner by the transporting device.

The foregoing objects and others ancillary thereto are accomplished according to a preferred embodiment of my invention wherein walking legs are attached to the transportation means so that they may be moved by power means in the vertical direction through a certain distance relative to the machine and relative to the ground. Thus, the machine may move in any desired direction relative to the ground and may also perform a turning movement on the spot or during "walking," which must be done when going through a bend. The power drive may be effected e.g. by steam, internal combustion or electrically via screw spindles or through pneumatically or hydraulically operated cylinder and piston drives.

One embodiment which is especially simple has each walking leg universally attached by means of several supports variable in length to at least three different points on the machine. The supports may be so arranged that the load is lifted and lowered again either by all supports or by some of the supports only, which means that some or all the supports are extended and shortened again in vertical direction by power means.

A simple construction for the supports and the power drive is achieved by using hydraulic means. In this case, the supports themselves form hydraulic cylinders, pistons, and piston rods, preferably in double acting arrangement. The hydraulic operation provides a suitable transmission of power to the supports and a remote control of the movement of the walking legs.

The ends of the supports are universally joined to the machine and to the walking leg, preferably through ball and socket joints. It is advantageous, but not absolutely necessary, to join the end of the substantially vertical load-carrying support directly to the machine, whereas the ends of the two substantially horizontal supports are joined thereto, preferably close to the walking leg.

It is difficult from the constructional point of view to join the horizontal supports on the centre axis of the vertical support. They are therefore joined outside the centre axis of the vertical support, which will be subjected to a torque about its longitudinal axis when the horizontal supports are operated leading to a rotation of the vertical support and consequently to an undesired twist of the pivot points. Therefore, means are provided which prevent a rotation of the vertical support about its longitudinal axis. These means include an arrangement comprising two rods or levers which are interconnected by means of a ball joint, whereby the one outer end is pivotally attached to a bolt of the vertical support located substantially normal to the longitudinal axis of the support, i.e., a bolt located substantially horizontal, whereas the other end is also attached to a substantially horizontal pivot point at the machine.

The walking legs should be arranged so that the centre of gravity is located within imaginary connecting lines between adjacent walking legs, that is, if e.g. three walking legs are used, within the triangle, the apices of which have the walking legs connected thereto.

Figure 2:
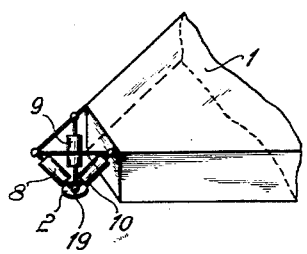
Figure 3:
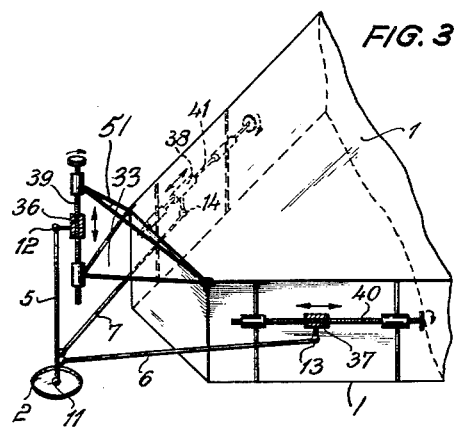
Figure 4:
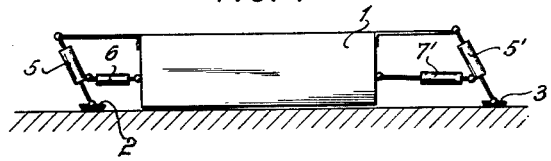
Figure 4A:
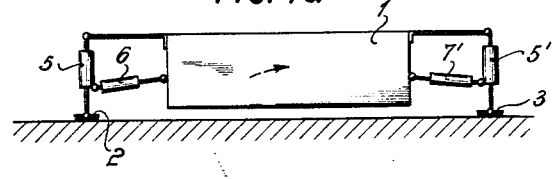
Figure 4B:
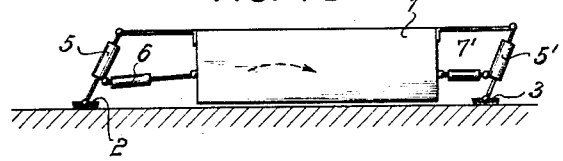
Figure 6:
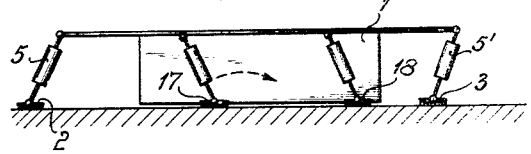
Figure 6A:
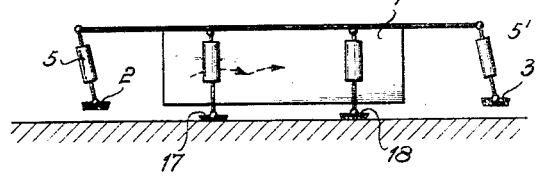
Figure 6B:
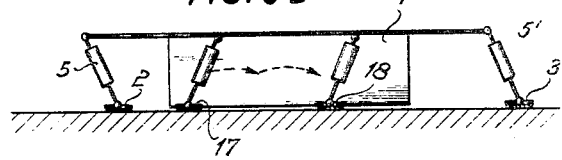

The invention will now be described by way of example with reference to the accompanying drawings in which:

Fig. 1 shows schematically a perspective view of a load transportation machine, having three walking legs, Fig. 2 shows schematically in perspective manner another arrangement of the supports for the walking legs, Fig. 3 shows schematically the arrangement of supports of variable length at the machine, Figs. 4–4b show the execution of a step whereby the load is placed on the ground, Fig. 5 shows schematically the return movement of a substantially vertical support invariable in length, Figs. 6–6b show schematically the execution of a step whereby the load is taken over by another group of walking legs, Fig. 7 shows in side elevation and in section the pivotal attachment and the construction of the hydraulically operated supports, and Fig. 7a is a perspective view of the arrangement according to Fig. 7.

In the arrangement shown schematically in Fig. 1, one walking leg 2, 3 and 4 is pivotally attached to the corners of a load carrying body 1. The attachment takes place through extensible supports, namely through one substantially vertical support 5, 5' and 5", respectively as well as through two substantially horizontal supports 6 and 7, 6' and 7', and 6" and 7", respectively, which almost form a right angle with each other. The combination of cooperating vertical and horizontal supports is referred to herein as "leg assemblies."

The vertical supports 5, 5', 5" are attached with their upper ends to triangular frame members 33 (integral with the load carrying body 1) by means of a joint, e.g. a ball and socket joint 12, which permits a swinging movement. In similar manner, the lower end is joined with a walking foot 2, 3 or 4, e.g. by a ball and socket joint 11. The horizontal supports 6 and 7 are each attached with one end through a ball and socket joint 13 and 14 with the body 1, and with the other ends by means of each a ball and socket joint 15 and 16, preferably with the lower end of the vertical support 5.

By extending the supports 5, 5', 5'', the load may be lifted from the ground and by extending or shortening the horizontal supports 6 and 7, or 6' and 7', or 6'' and 7'', accordingly, the load may be moved in any desired direction across the ground whereby the load also may be turned.

According to the arrangement shown in Fig. 1, the vertical supports 5, 5', 5'' take up the load during lifting and carrying and therefore are dimensioned accordingly, whereas the horizontal supports 6 and 7 merely have to take up the lateral component of the load which appears when the vertical support 5 is in inclined position and therefore may be made smaller. The preferred embodiment according to Fig. 1 shows clearly the position of the supports 5, 6 and 7 in their initial position with support 5 erect and supports 6 and 7 disposed normally thereto. A modified arrangement of the supports, is shown in Fig. 2. Three supports 8, 9 and 10 which preferably form acute angles, in the initial position, carry the load equally. Only when the load carrying body 1 is displaced laterally, that means, when the feet 2, 3, 4 are laterally displaced with respect to the body 1 by mutually varying the length of the supports 8, 9 and 10, a different distribution of forces on the supports 8, 9 and 10 arises. Unlike the arrangement shown in Fig. 1, the process of the single supports is less clearly discernable. The lower ends of the supports 8, 9 and 10 should be connected through a common lower ball and socket joint 19 to the walking foot 2. As, however, it is difficult to construct such a joint, the lower ends of the supports 8, 9 and 10 may be attached to the walking foot 2 through ball and socket joints located more or less closely together.

Another modification of the invention is shown in Fig. 3. The attachment of extensible supports 5, 6 and 7 to the body 1 is schematically shown by means of displaceable pivot points 12, 13 and 14. The pivot points 12, 13 and 14 are for instance attached to threaded bushings 36, 37, 38, which may be displaced by means of screw spindles 39, 40, 41 supported in bearings secured to supports 33, 51 and to two sides of the body 1. The direction of movement of the threaded bushings 36, 37, 38 substantially should correspond with the direction of the corresponding supports 5, 6 and 7, however, the direction of the corresponding supports 5, 6 and 7 also may differ from the direction of movement of the bushings; instead of screw spindles, any other feeding means may be used, e.g. piston drives.

In Figs. 4–4b, the process of motion during one step is schematically shown, whereby for sake of illustration, the horizontal supports 6' and 7' as well as the support arrangements 5'', 6'', 7'' with the walking foot 4 have been omitted. The body 1 initially rests on the ground. The walking legs 2 and 3 are brought into the desired direction of movement of the body by shortening or extending the horizontal supports 6, 7', and placed on the ground by extending the supports 5, 5'. Then, the supports 5, 5' are brought into a vertical position by extending the horizontal support 6 as shown in Fig. 4a, whereby the load carrying body 1 is lifted from the ground and moved in the direction of the arrow to the right. By further extending the support 6' and shortening the support 7', the load is moved still further to the right and placed on the ground again, as shown in Fig. 4b. Then, the walking feet 2 and 3 are brought into the position according to Fig. 4, whereby the supports 5 and 5' transitorily are shortened, so that the walking legs may perform a movement across the ground. The next step may take place in the same manner as described above. In the described performance, the length of the supports 5, 5' is not altered during lifting of the load, but the horizontal supports 6 and 7' perform the lifting work.

Also, another form of operation may be used with advantage, in which the supports 5 and 5' at first are vertical and then the load is lifted from the ground by extending these supports, so that the position is reached as shown in Fig. 4a. The lifting work is done by the supports 5 and 5' only.

The load then may be lowered to the ground as shown in Fig. 4b in that the supports 5 and 5' are pivoted by means of the horizontal supports 6 and 7', whereby the second half of the step is covered, whereafter the mode of performance commences anew.

When the load is lowered from the position shown in Fig. 4a into the position shown in Fig. 4b, the horizontal supports 6 and 7' are merely required to brake the tilting movement of the supports 5 and 5'.

Fig. 5 shows how the walking foot 2 may be returned into its initial position for the next step, without shortening it in this case. The walking foot 2 is lifted from the ground after the step has been performed by further tilting the support 5 and then is moved on a semi-circular arc 42 into the new starting position on the ground, shown in broken lines. The horizontal supports 6 and 7, which perform the movement of the support 5, are omitted in Fig. 5 for the sake of illustration. Accordingly, the supports 5 may be made extensible and the pivot point 12 on the frame member 33 may be arranged displaceable in height in the described mode of performance.

Instead of placing the load carrying body 1 on the ground again after each step, a second group of walking legs may take over the load, whereby a continuous movement of the load without altering its clearance to the ground may be achieved; that means, without expending lifting work. The supports 5 and 5', however, must be shortened and extended during its swinging movement, so that the clearance between body and ground is kept substantially equal during "walking." In Figs. 6–6b, counter-phased moving groups are indicated as 2 and 3 and 17 and 18, respectively.

The remaining horizontal supports 6' and 7 as well as 6'' and 7'' of course must be shortened and extended in synchronized manner during walking. By altering the length of the horizontal supports accordingly, and synchronizing with the desired direction of movement, the load may be moved in any desired direction.

Instead of a group with three walking legs as shown in Fig. 1, any desired larger number may be used, so as to achieve a better distribution of the load on the ground and to take into account a poor internal rigidity.

In Figs. 7 and 7a, the construction of a walking foot as well as its supports and attachments to the machine is shown.

The walking foot 20, owing to its all round movability, in the horizontal plane preferably is constructed as a circular plate, in reinforced hollow construction. The centre of the walking foot is joined with the vertical support 5 comprising a pressure cylinder 21 and a piston rod 22 by means of a ball and socket joint 11. The upper end of the supports 5 are joined by a ball and socket joint 12 with the carrying frame members 33. The frame members 33 e.g. may be secured to the body by means of attachment eyes 34 and 35 to form a complete chassis or frame integral with the body and from which the load is suspended. At the lower end of the piston rod 22 a piston 23 is provided which is sealed at both ends by means such as gaskets 24 and 25 with respect to the inner wall of the cylinder. The piston rod 22 is guided in the cylinder top 19. Above and below the piston 23, supply lines 26 and 27 for the pressure medium, e.g. pressure oil, are connected to the cylinder 21. For lateral support of the support 5, the substantially horizontally arranged supports 6 and 7 are provided, of which in Fig. 7 only the support 7 is visible. The support 7 is joined with the carrying frame by a ball and socket joint 14 and with the support 5 close to the lower end thereof with the ball and socket joint 16. The support 6 is similarly attached through ball and socket joints 13 and 15. The construction of the supports 6 and 7 is similar to the construction of the supports 5, except that the diameter of the piston of the supports 6 and 7 is smaller than that of the support 5.

The ball and socket joints 15 and 16 are located outside the longitudinal axis of the support 5. When the supports 6 and 7 are operated, a torque may be exerted on the support 5, which would lead to undesired twist and displacement of the ball and socket joints. To prevent this, the cylinder 21 of the support 5 to which also the sockets of the two ball joints 15 and 16 are attached, is connected to the carrying frame 33 through two substantially rectangular rods 29 and 30. The rod 29 is linked by a substantially horizontal bolt 28 to the cylinder 21 of the support 5 and through a bolt 32 substantially parallel to the bolt 28 to the carrying frame 33. Both rods 29 and 30 are interconnected by a ball and socket joint 31 (Fig. 7) or through an equivalent joint, e.g. a Cardan joint, rotatably attached to one of the rods 29 or 30. This rod arrangement guarantees that the support or its cylinder no longer rotates about its axis. The longitudinal axes of the supports 6 and 7 intersect the axis of the support 5 with sufficient accuracy at every horizontal movement of the walking foot 20, so that the torsion forces transmitted by the supports to the cylinder 21 are already small enough.

The rhythm of operation of the walking legs may be controlled by a central control device, preferably associated with and paticipating in the movement of the load carrying body.

Instead of placing the load on the ground with each step, it may be transferred to a second group of walking legs which perform counterphase movements with respect to the first group. There may be further groups of walking legs to obtain an almost steady onward movement. The rhythm of movement of these groups may be suitably synchronized and, if necessary, with overlap.

When hydraulic operation is used, it is practical with regard to an economical operation to apply the pressure only during the lifting and the forward movement of the load, whereas low pressure oil, for instance by admitting compressed air, should be used to return the walking legs into their initial position. Part of the work which is liberated when the load is lowered again may be regained in form of a certain volume of high pressure oil.

Although certain specific embodiments of the invention have been shown and described, it is obvious that many modifications thereof are possible. The invention, therefore, is not to be restricted except insofar as is necessitated by the prior art and by the spirit of the appended claims.

I claim:

1. A load transporting device for heavy loads comprising a load carrying body, a plurality of spaced walking leg assemblies universally connected to said body, each leg assembly including three extensible members, the axis of one of said members being selectively movable from a vertical to an oblique plane and vice versa, the axes of the other members being selectively movable from a horizontal to an oblique plane and vice versa, said other members being connected at an angle to each other with the apex thereof located on the said one member, whereby by lengthening and shortening said members each leg assembly may be moved in any desired direction so that a load may be moved in any direction.

2. The combination of claim 1 wherein said members are hydraulic cylinders, ball and socket joints connecting said members to the base and connecting said other members to said one member so that the legs are universally connected to the base.

3. The combination of claim 2 comprising pairs of levers, universal joints connecting the levers of each pair, the free ends of the levers of each pair being pivotally connected to said body and said one member respectively, with the pivotal axes being horizontally disposed to prevent twisting of said one member.

4. The combination of claim 1 wherein there are at least three legs so disposed that the center of gravity of the load will lie within the border defined by imaginary lines between adjacent legs.

5. The combination of claim 1 comprising screw spindle assemblies for extending and retracting said members, one end of each of said members being swivelly connected to said screw spindle assemblies, a portion of said screw spindle assemblies being fixed to said body so that selective rotation of the spindles will enable said leg to be moved in any direction.

6. A heavy load transporting device comprising a load-carrying body normally disposed in a horizontal plane, at least three walking legs for supporting said body, universal joints connecting one end of each said legs to said body, a pair of extensible and contractable braces disposed at an angle to each other and universally connected between each of said legs and said body for moving the other end of said legs in any direction, and means for extending and contracting said braces to effect walking by said legs and transporting a load in any direction.

7. A load transporting device according to claim 6 wherein said legs are extensible and contractable and means for extending and contracting said legs to lift and lower said body as said legs are walked by said braces.

8. The combination of claim 6 comprising means connected to each leg for preventing turning of the leg about its longitudinal axis but permitting angular movement thereof about an axis spaced from the longitudinal axis.

9. A heavy load transporting device comprising a substantially horizontal frame supported by at least three vertically extensible walking legs, a load-carrying body secured integrally to said frame between said walking legs, universal joints for connecting said walking legs at their upper ends to said frame, supporting feet connected to the lower ends of said legs, a pair of extensible and contractable braces disposed at an angle to each other and universally connected between each of said legs and said body for moving said feet in any direction, and means for extending and contracting said braces to effect movement of said body in any direction.

10. The device of claim 9 wherein said legs and said braces are operated by hydraulic cylinders.

References Cited in the file of this patent

UNITED STATES PATENTS

| | | |
|---|---|---|
| 2,452,632 | Cameron | Nov. 2, 1948 |
| 2,639,048 | Glashaw | May 19, 1953 |
| 2,777,528 | Jourdain | Jan. 15, 1957 |